(12) United States Patent
Pickering, Jr.

(10) Patent No.: US 7,441,676 B2
(45) Date of Patent: Oct. 28, 2008

(54) DEVICE FOR DISPENSING MEDIA

(75) Inventor: Drew Pickering, Jr., Shelton, CT (US)

(73) Assignee: KenzINC llc., Stratford, CT (US)

( * ) Notice: Subject to any disclaimer, the term of this patent is extended or adjusted under 35 U.S.C. 154(b) by 211 days.

(21) Appl. No.: 11/046,457

(22) Filed: Jan. 28, 2005

(65) Prior Publication Data

US 2005/0173467 A1 Aug. 11, 2005

Related U.S. Application Data

(60) Provisional application No. 60/539,697, filed on Jan. 28, 2004.

(51) Int. Cl.
*B65D 88/26* (2006.01)
(52) U.S. Cl. .................... 222/460; 222/461
(58) Field of Classification Search ................ 222/460, 222/461, 462; 141/108
See application file for complete search history.

(56) References Cited

U.S. PATENT DOCUMENTS

| | | | | |
|---|---|---|---|---|
| 200,149 | A * | 2/1878 | Newman | 141/328 |
| 1,175,709 | A * | 3/1916 | Cole | 30/326 |
| 1,347,112 | A * | 7/1920 | Merfeld | 222/461 |
| 4,283,951 | A | 8/1981 | Varpio | |
| 5,549,227 | A | 8/1996 | Klotz | |
| 5,884,523 | A | 3/1999 | Cheng et al. | |
| 6,470,745 | B1 | 10/2002 | Reay et al. | |
| 6,974,056 | B2 * | 12/2005 | Rea | 222/460 |
| 2005/0017028 | A1 | 1/2005 | Rea | |

OTHER PUBLICATIONS

International Preliminary Search Report (Oct. 12, 2006).

* cited by examiner

*Primary Examiner*—Frederick C. Nicolas
(74) *Attorney, Agent, or Firm*—Scott D. Wofsy; Edwards Angell Palmer & Dodge LLP (57) ABSTRACT

Disclosed are devices for dispensing media which include, inter alia, a dispenser body, a funnel-shaped cover and a mechanism for securing the cover in the closed position to facilitate the dispensing of media from the spout. The body of the dispenser has an elongated handle with proximal and distal ends and a scoop depending from the distal end of the handle. The funnel-shaped cover is attached to the body of the dispenser and includes an upper spout and a lower base. The cover is adapted for movement between an open position and a closed position; wherein in the open position the cover is spaced apart from the scoop and allows media to be placed into the scoop, and in the closed position, the cover is placed over the scoop such that when media is dispensed from the scoop it passes through the spout of the cover. Also disclosed is a device for dispensing media which includes, among other elements, an elongated handle, a scoop and a stopper arm. The stopper arm is attached to the scoop and moves between a closed position wherein a portion of the arm prevents media from pouring out of the spout of the scoop and a open position wherein media is allowed to pour out of the spout.

1 Claim, 12 Drawing Sheets

DEVICE FOR DISPENSING MEDIA

CROSS REFERENCE TO RELATED APPLICATIONS

This application claims priority to U.S. Provisional Patent Application No. 60/539,697 filed Jan. 28, 2004, which is herein incorporated by reference in its entirety.

BACKGROUND OF THE INVENTION

1. Field of the Invention

The present invention relates to dispensing devices, and more particularly, to a dispenser that includes a scoop and a funnel-shaped cover to facilitate the transferring of metered amounts of a substance (i.e., a fluid or a particulate) to a container having a small mouth.

2. Background of the Related Art

Newborn babies are often fed, at least partly, by using powdered milk products. In making the milk, the amount of powder used in the formula must be carefully measured and transferred to a container to be mixed with water. Since powdered milk products often do not contain preservatives and spoil within 48 hours, they are usually mixed in single serving portions. As a result, parents typically mix the formula directly in the baby bottle. However, baby bottles typically have a very small mouth, making it difficult to transfer the carefully-measured powder to the bottle without spilling a potion of the powder.

Many nutritional and fitness supplements are also sold in powdered form. Like powdered milk, these supplements are mixed with water or other liquids to obtain a desired end-product. Typically, a single serving mixture is created to eliminate the need to store or carry large quantities of liquid. For example, a hiker can easily carry a one weeks supply of a supplement or energy drink in powdered form, but could not reasonably carry the equivalent amount of the supplement in liquid form. Consequently, the hiker will normally carry a small bottle for use in mixing individual servings of the supplement. Like traditional baby bottles, a hiker's bottle has a small mouth making it difficult to measure and transfer the powdered supplement without spillage.

U.S. Pat. No. 6,470,745 to Reay et al. discloses a prior dispenser for powdered baby milk. The Reay et al. dispenser includes a handle, a scoop having an open mouth for receiving the powdered milk and a leveling mechanism for ensuring an accurate quantity of powder is obtained. Prior dispensers, like that disclosed in Reay et al., are well-suited for quickly scooping a desired amount of powder, but they are poorly-suited for delivering the powder to the mixing container or bottle without spillage. The Reay et al. dispenser, and others like it, have a scoop with a wide or large diameter mouth. The mouth typically has a diameter equivalent to that of the cylindrical scoop body so that air pockets are not formed in the scooped powder preventing accurate measurement. As a consequence of the wide mouths on prior scoops, spillage occurs when attempting to transfer the powder to a baby bottle or small-mouthed container, thereby defeating the user's careful measurement of the powder that took place prior to the transfer.

As noted above, a common problem associated with prior dispensers for use with powdered products is the ability to transfer the measured product to the mixing receptacle without spilling the product. Still further, prior devices are difficult to clean and not easily manufactured. For example, U.S. Pat. No. 5,884,523 to Cheng et al. discloses a scoop that includes a counter to assist in remembering the number of scoops that have been put into the bottle. Although the counting device has utility, the utility is thwarted due to the spillage that occurs when transferring the product to the container or bottle. Still further, the disclosed counting mechanism adds significantly to the cost of the dispenser and complicates cleaning the device.

Therefore, there is a need for a dispenser capable of easily and quickly supplying metered amounts of a substance to a container having a small mouth without spillage. Still further, there is a need for a dispenser that in addition to eliminating spillage, is cheap to manufacture and easy to clean for reuse.

SUMMARY OF THE INVENTION

The present disclosure is directed to devices for dispensing media which include, inter alia, a dispenser body, a funnel-shaped cover and a mechanism for securing the cover in the closed position to facilitate the dispensing of media from the spout. The body of the dispenser has an elongated handle with proximal and distal ends and a scoop depending from the distal end of the handle. The funnel-shaped cover is attached to the body of the dispenser and includes an upper spout and a lower base. The cover is adapted for movement between an open position and a closed position; wherein in the open position the cover is spaced apart from the scoop and allows media to be placed into the scoop, and in the closed position, the cover is placed over the scoop such that when media is dispensed from the scoop it passes through the spout of the cover.

In a preferred embodiment, the handle of the dispensing device has a C-shaped cross section. Additionally, the handle has an aperture formed in the distal end thereof. It is presently envisioned that the mouth of the scoop can be beveled to prevent media from being supported thereon.

It is also presently preferred that the diameter of the base of the funnel-shaped cover is larger than the diameter of the mouth of the scoop such that in the closed position a portion of the scoop extends within the cover. It is also envisioned that the handle has struts formed on a surface thereof for longitudinally stiffening the handle. The benefits of the above-described features will be discussed in more detail hereinbelow.

In certain preferred embodiments, the cover is mounted to the handle and the handle includes a mechanism for allowing the cover move between the open and the closed position. In one such embodiment, a plastic hinge is associated with the proximal end of the handle and is used to mount the cover to the handle and allow the cover to move between the open and the closed position.

In alternative embodiments, the cover is mounted to the scoop using a flexible hinge that defines a hinge axis which extends generally tangential to the mouth of the scoop. Preferably, the hinge axis for the cover intersects a longitudinal axis defined by the handle at an acute angle therewith. It is presently envisioned that the flexible hinge includes first and second hinge arms, the first hinge arm being attached to the cover and the second hinge arm being attached to the body and wherein the hinge arms are spaced apart when the cover is in the closed position.

It is further envisioned that in certain embodiments, the handle, scoop, cover and mechanism for securing the cover in the closed position are a single-piece molded construction.

Preferably, the mechanism for securing the cover in the closed position includes at least one securing arm associated with the cover which cooperates with at least one beveled land formed on the scoop and urges the cover in the closed position.

Preferably, the spout of the cover is adapted for being received with the mouth of a conventional baby bottle or drinking bottle.

The present disclosure is also directed to a device for dispensing media which includes, among other elements, an elongated handle, a scoop and a stopper arm. The elongated handle has proximal and distal ends and the scoop depends from the distal end of the handle and has an upper mouth portion and a funnel shaped lower base that defines a spout. The stopper arm is attached to the scoop and moves between a closed position wherein a portion of the arm prevents media from pouring out of the spout of the scoop and a open position wherein media is allowed to pour out of the spout.

In a preferred embodiment, the dispenser further includes a mechanism for securing the stopper arm in the closed position to prevent the dispensing of media from the spout.

Preferably, the handle, scoop and stopper arm are formed as a single-piece molded construction and the stopper arm is attached to the scoop with a plastic hinge.

BRIEF DESCRIPTION OF THE DRAWINGS

So that those having ordinary skill in the art to which the present application pertains will more readily understand how to make and use the same, reference may be had to the drawings wherein:

FIG. 1c is a bottom perspective view of the dispensing device of FIG. 1a,

FIG. 2b is a bottom plan view of the dispensing device of FIG. 2a;

These and other features of the dispensing device of the present application will become more readily apparent to those having ordinary skill in the art form the following detailed description of the preferred embodiments.

DETAILED DESCRIPTION OF PREFERRED EMBODIMENTS

Referring now to the drawings wherein like reference numerals identify similar structural aspects of the subject invention, there is illustrated in FIGS. 1a-1g, a dispenser designated by reference numeral 100 for use in scooping a powdered substance from a container and transferring that substance without spillage to a receptacle having a small mouth, such as a baby bottle. The substance is, for example, a powder milk product used to feed an infant or a nutritional substance used by an athlete. The substance need not be a fine powder, but may be, for example, a granular particulate or liquid.

Dispenser 100 includes, inter alia, a dispenser body 15, a funnel-shaped cover 40 and a mechanism 45 for securing the cover in the closed position to facilitate the dispensing of media from spout 42. The body 15 of the dispenser 100 has an elongated handle 10 having a proximal 12 end and a distal end 14 and a scoop 20 depending from the distal end 14 of the handle 10.

The funnel-shaped cover 40 is attached to the body 15 of dispenser 100 and includes an upper spout 42 and a lower base 44. The cover 40 is adapted for movement between an open position and a closed position; wherein in the open position the cover 40 is spaced apart from the scoop 20 and allows media to be placed into the scoop 20, and in the closed position, the cover 40 is placed over the scoop 20 such that when media is dispensed from the scoop 20 it passes through spout 42 of cover 40. The inner surface 46 of cover 40 is configured with a smooth radius to allow the media to freely dispense from device 100 through spout 42 without clogging.

The handle 10 of dispensing device 100 has a C-shaped cross section. Additionally, the handle 10 has an aperture 16 formed in the distal end 14 thereof. Having such a configuration is advantageous in that any media that rests on the handle 10 during the scooping procedure is guided by the channel created by the C-shaped cross-section to the aperture 16 and drops back into the media supply container without spillage.

The mouth 22 of the scoop 20 is beveled to prevent media from being supported thereon. This feature reduces the spillage of the media during the scooping process. Moreover, since media cannot collect on mouth 22 of scoop 20, the cover 40 can fit snuggly on the scoop 40 without media buildup preventing a tight seal.

In the embodiment disclosed in FIGS. 1a-1d, the diameter of the base 44 of the funnel-shaped cover 40 is larger than the diameter of the mouth 22 of the scoop 20 such that in the closed position a portion of the scoop 20 extends within the cover 40. As a result, when the cover 40 is moved into the closed position, the wider diameter on the base 44 helps align/center the cover 40 with the mouth 22 of the scoop 20.

Figure 1A:
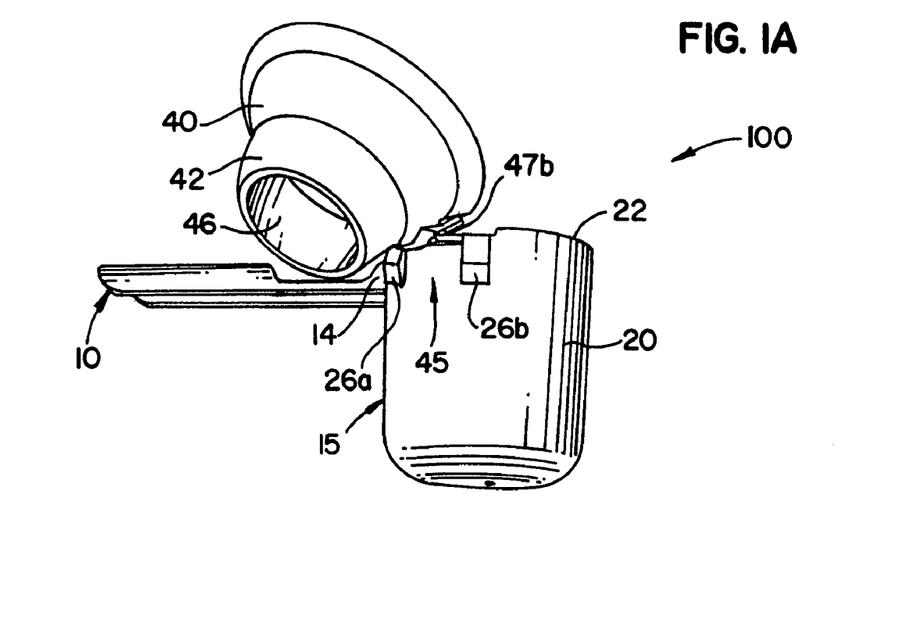
FIG. 1a is a side perspective view of an embodiment of the dispensing device of the present invention shown with the cover in the open position.
Figure 1B:
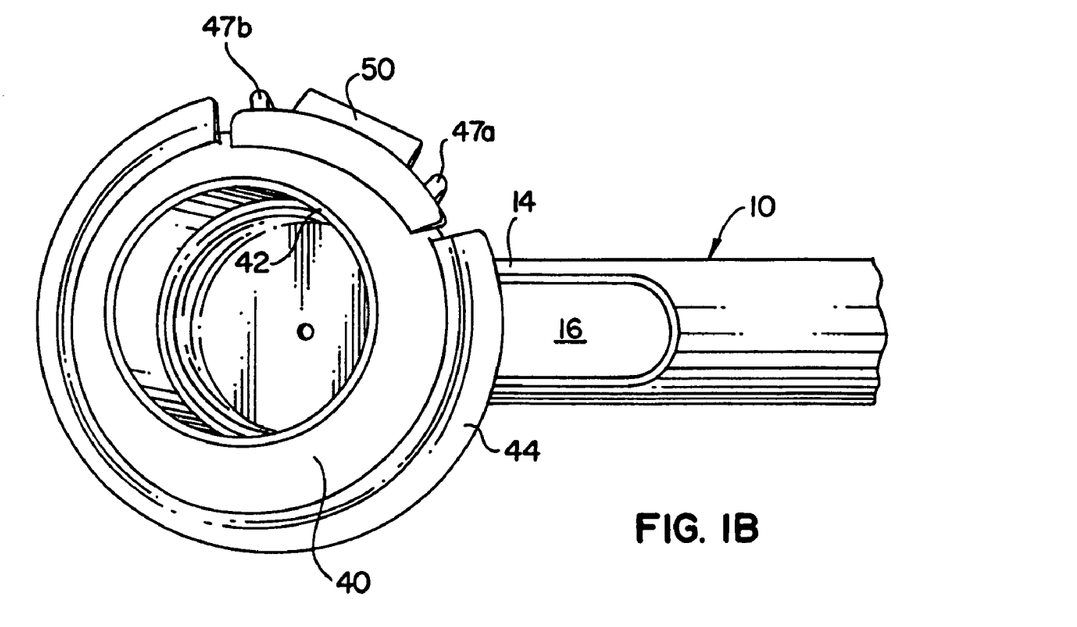
FIG. 1b is a overhead plan view of the dispensing device of FIG. 1a shown with the cover in the closed position.
Figure 1C:
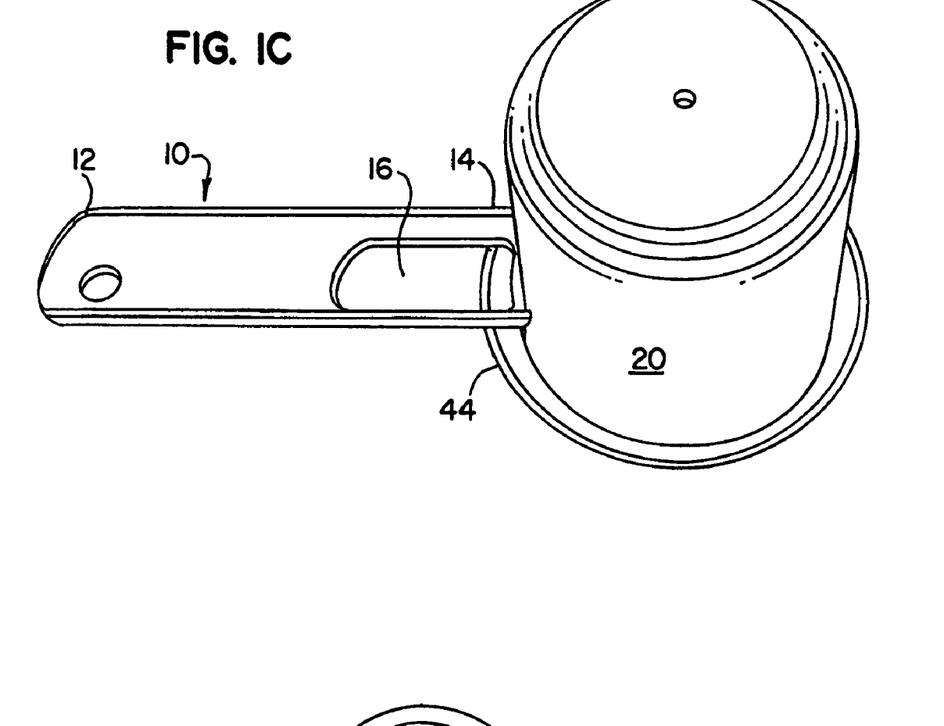
Figure 1D:
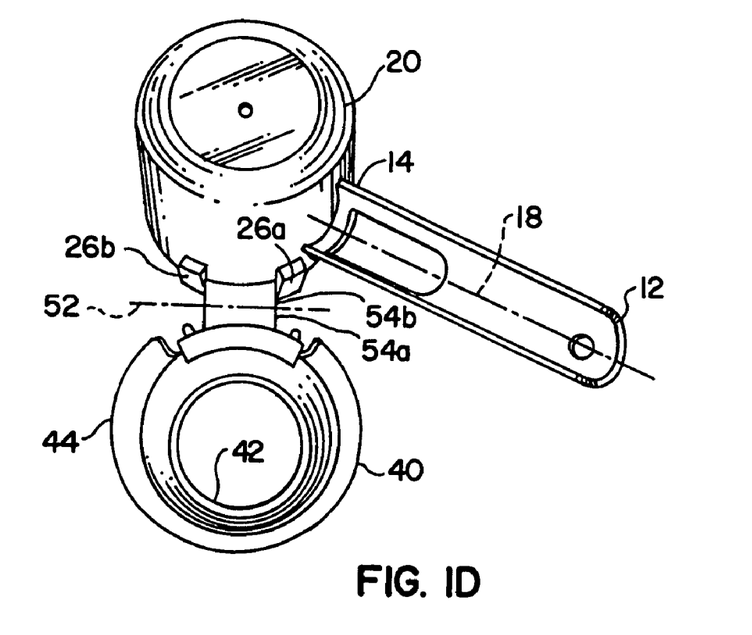
FIG. 1d is a bottom perspective view of the dispensing device of FIG. 1a shown with the cover in the open position.
Figure 1E:
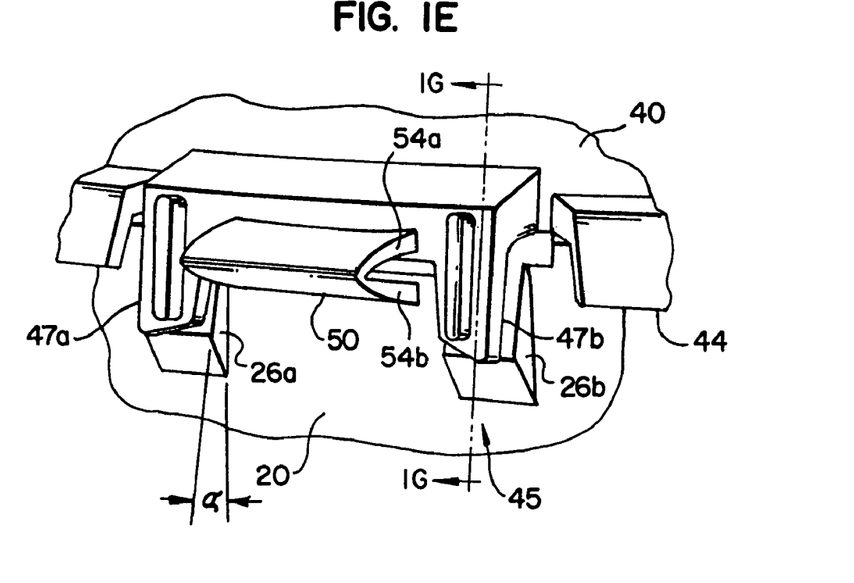
FIG. 1e is an enlarged perspective view of a hinge used for securing the cover to the scoop and mechanism for urging the cover in the closed position.

As shown, the cover 40 is mounted to the scoop using a flexible hinge 50 that defines a hinge axis 52 which extends generally tangential to the mouth 22 of the scoop. Preferably, the hinge axis 52 for the cover 40 intersects a longitudinal axis 18 defined by the handle 10 at an acute angle therewith. The flexible hinge 50 includes first and second hinge arms 54a and 54b, respectively. The first hinge arm 54a is attached to the cover 40 and the second hinge arm 54b is attached to the scoop 40. As shown in FIG. 1e, the hinge 50 has been configured such that a space is provided between the hinge arms 54a and 54b when the cover 40 is in the closed position. As a result, even if media collects on top of hinge arm 54b, the cover 40 will still close completely.

In dispensing device 100, the handle 10, scoop 20, cover 40, hinge 50 and mechanism 45 for securing the cover 40 in the closed position are a single-piece molded construction.

Figure 1F:
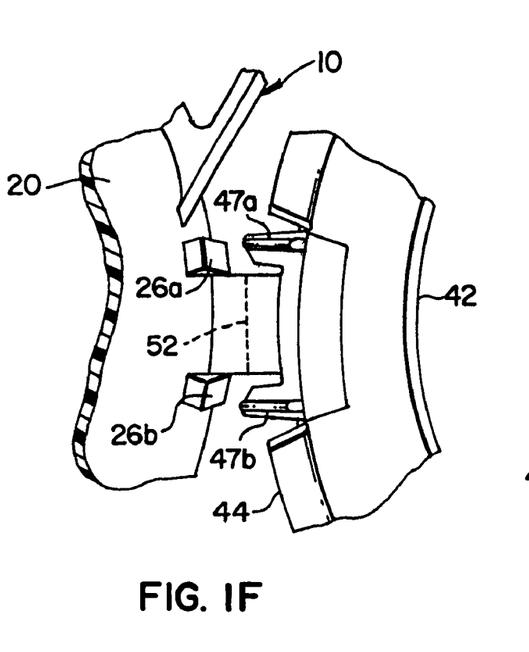
FIG. 1f is a bottom view of the hinge and closing mechanism of FIG. 1e wherein the cover is in the partially open position.
Figure 1G:
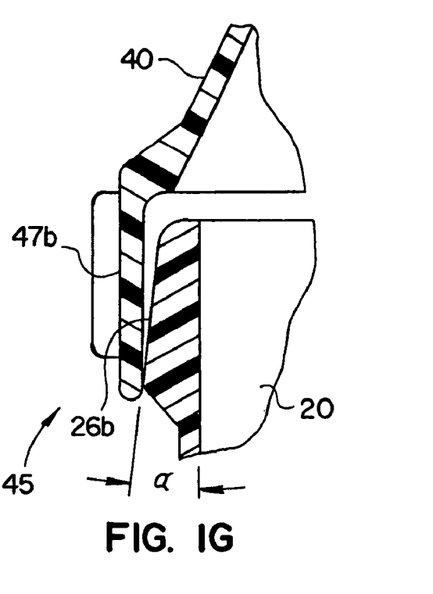
FIG. 1g is a cross-sectional view of an embodiment of the mechanism for urging the cover in the closed position.

Mechanism 45 secures the cover 40 in the closed position and includes first and second securing arms 47a and 47b which are associated with the cover 40 and first and second beveled lands 26a and 26b formed on the scoop 20. Securing arms 47a and 47b project perpendicularly downward from the base 44 of cover 40. Beveled lands 26a and 26b are formed at an angel "α" with respect to vertical. As a result, when the cover 40 is being moved into the closed position, the securing arms 47a and 47b contact the upper portion of the beveled lands and begin to flex. As the cover 40 is further closed, the angle "α" of the beveled lands 26a and 26b causes the securing arms 47a and 47b to further flex and increases the frictional contact between the arms 47a/47b and the beveled lands 26a/26b. It is this frictional force, which urges the cover 40 in the closed position and restrains it in this position when the media is dispensed. Those skilled in the art will readily appreciate that the number of securing arms and corresponding beveled lands can vary and the cover can be urged and restrained in the closed position with a single securing arm and land.

Figure 2A:
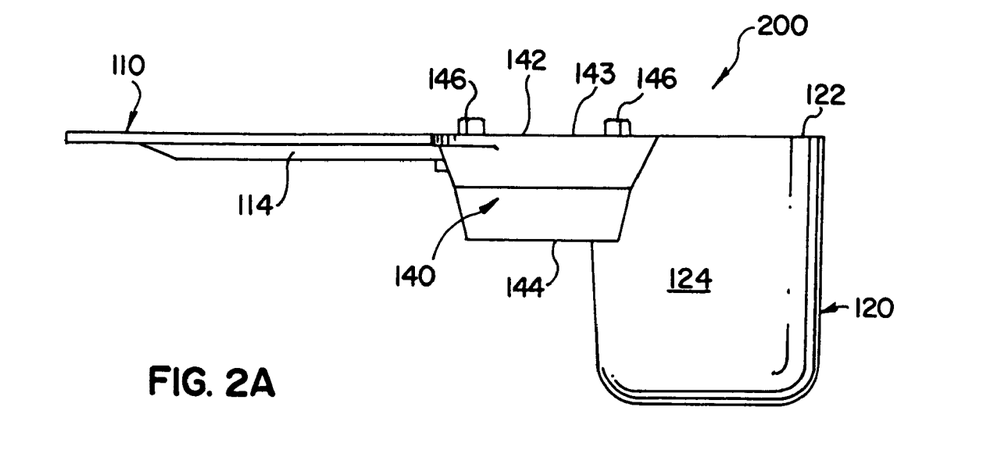
FIG. 2a is a side elevational view of the dispensing device of the subject invention with the cover in an open position.
Figure 2B:
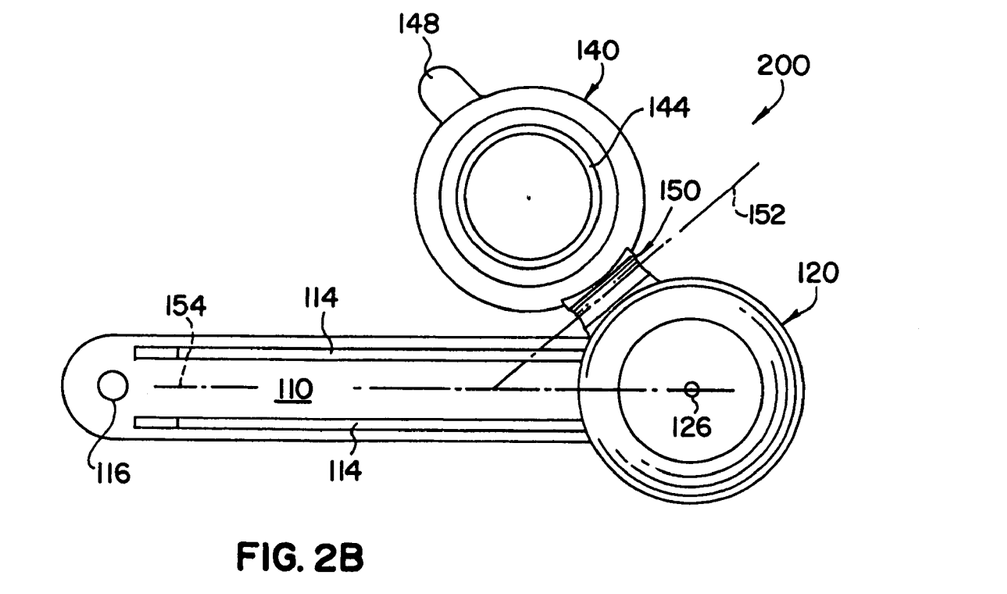
Figure 3:
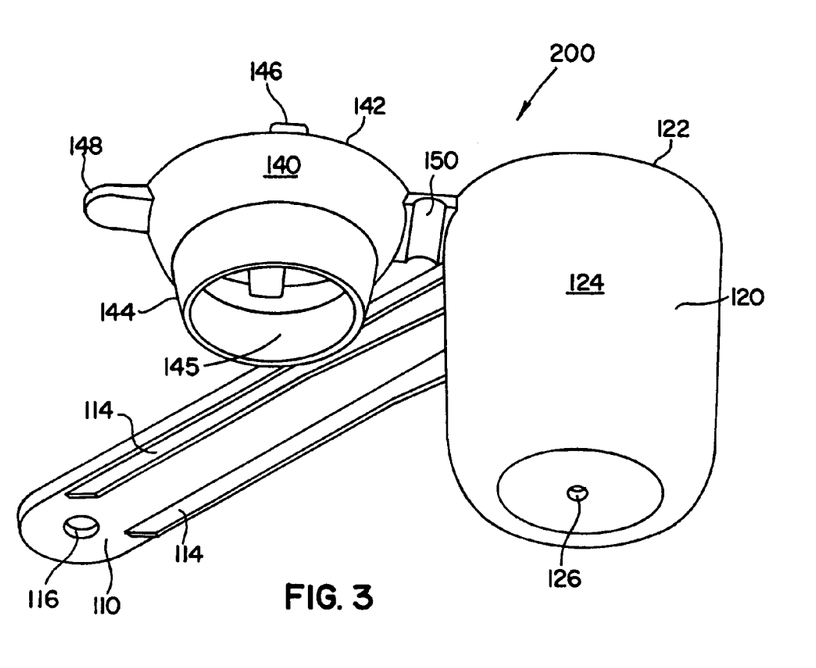
FIG. 3 is a perspective view of the dispensing device of FIGS. 2a and 2b as viewed from below.

Referring now to FIGS. 2a, 2b and 3, there is illustrated a further dispenser embodiment of the present invention which has been designated by reference number 200. Dispenser 200 includes, inter alia, an elongated handle 110 attached to cylindrical scoop 120. As shown, the handle 110 is preferably linear and defines a longitudinal axis 154 for dispenser 200. The handle 110 has two ribs or struts 114 formed on an underside surface thereof for increasing the axial stiffness of the handle 110. The handle 110 has a hole 116 formed in one end thereof which allows the dispenser 200 to be mounted to a wall, for example, using a hook.

The cylindrical scoop 120 has an open mouth 122 at one end for receiving the substance to be measured and transferred to the mixing container. As shown, the scoop 120 has an opaque side wall 124, but those skilled in the art will recognize that the scoop 120 could have a clear side wall to facilitate the measuring of the substance and the reading of graduated marks applied to the side wall (on the inside or the outside surface). An air-exchange hole 126 is provided in the bottom of the scoop 120 to facilitate the receiving and discharging of the powdered substance. Those skilled in the art would readily appreciate that the addition of hole 126 is optional and the size of hole 126 is dictated by the grain size of the substance being measured by the scoop.

The dispenser further includes a cover 140 connected to the scoop 120 at the mouth 122 and mounted for movement between an open position and a closed position. The cover is frustoconical or funnel-shaped and includes a rim 142 at a bottom end 143 and a discharge orifice 145 at an upper dispensing end 144. In the open position, the rim 142 of the cover 140 is spaced apart from the mouth 122 of the scoop 120 and in the closed position they are in substantially mating contact. The dispensing end 144 is adapted and configured for insertion into a small-mouthed bottle and orifice 145 allows the powder to be transferred from the scoop 120 to the bottle without spillage.

In the embodiment disclosed herein the cover 140 is mounted to the scoop 120 using a elastomeric/plastic hinge 150 formed tangent to the mouth 122 of the scoop 120. The axis of the hinge 152 intersects longitudinal axis 154 for dispenser 200 at an acute angle. It is envisioned that other hinge mechanism can be used to secure the cover 140 to the scoop 120 without departing from the inventive aspects of the present disclosure.

The cover 140 is secured in the closed position with interlocking tabs 146 and receptacles (not shown). The number and spacing of the tabs 146 and receptacles can be varied without departing from the inventive aspects of the present disclosure.

The cover 140 further includes a radially projecting tab 148, which is located diametrically opposite from the hinge 150 and is used for manipulating the cover from the open position to the closed position and vise versa.

As shown herein, the handle 110, scoop 120, cover 140 and the hinge 150 are formed from a single piece of molded plastic. Those skilled in the art would readily appreciate that dispensers 100 and 200 could be fabricated such that the cover is permanently in the closed configuration and does not articulate to the open position.

Figure 4A:
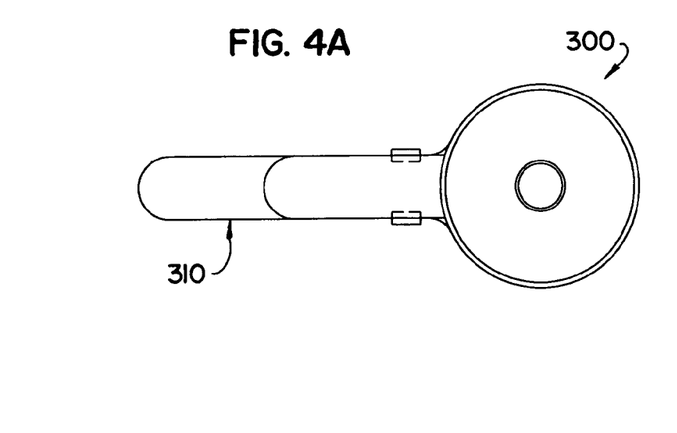
FIGS. 4a-4c illustrate another embodiment of the dispensing device of the present invention wherein the cover is slidably mounted to the handle.
Figure 4B:
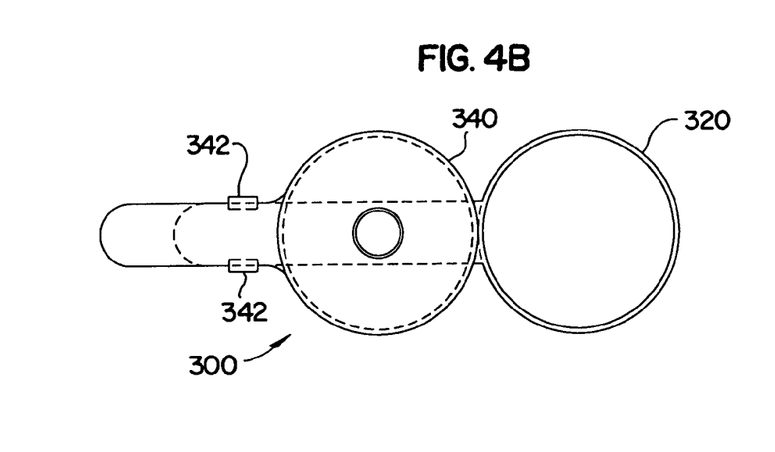
Figure 4C:
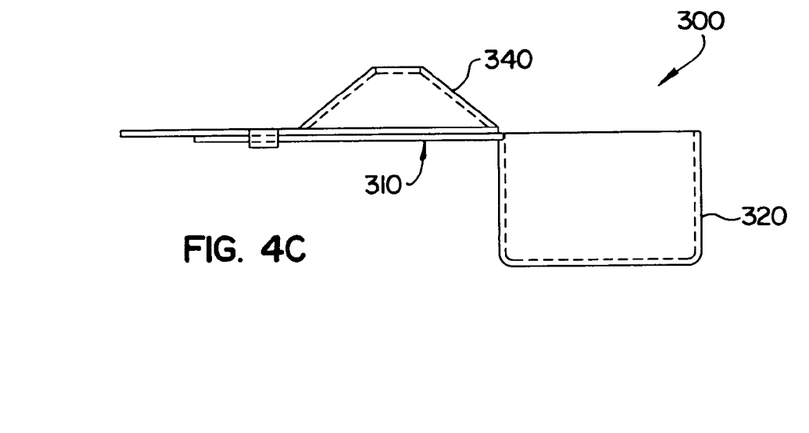

Referring now to FIGS. 4a through 4c, which illustrate another dispenser of the present disclosure designated by reference number 300. In this embodiment, the cover 340 for dispenser 300 is slidably mounted to handle 310 by brackets 342 and moves axially between the open and the closed positions. This method for mounting the cover 340 allows the cover to be used as a leveling device. If the scoop 320 is overflowing with media, closing the cover 340 will level off the media to the desired amount.

Figure 5A:
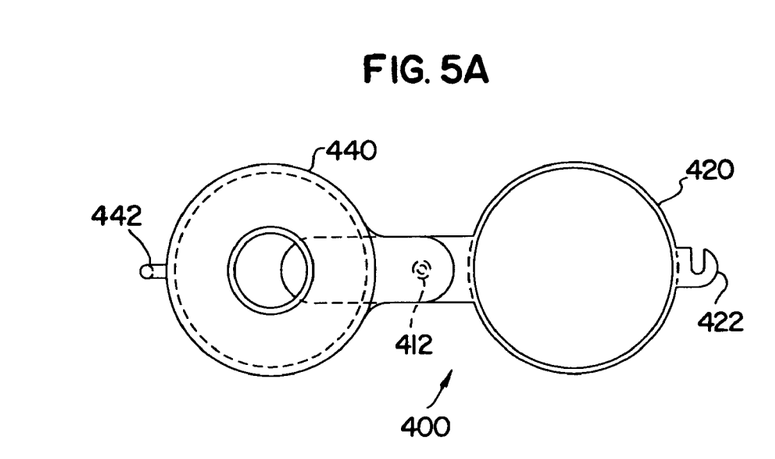
FIGS. 5a and 5b illustrate another embodiment of the dispensing device in accordance with the present invention wherein the cover is mounted to the handle and pivots about a fulcrum positioned approximately at the mid-length of the handle.
Figure 5B:
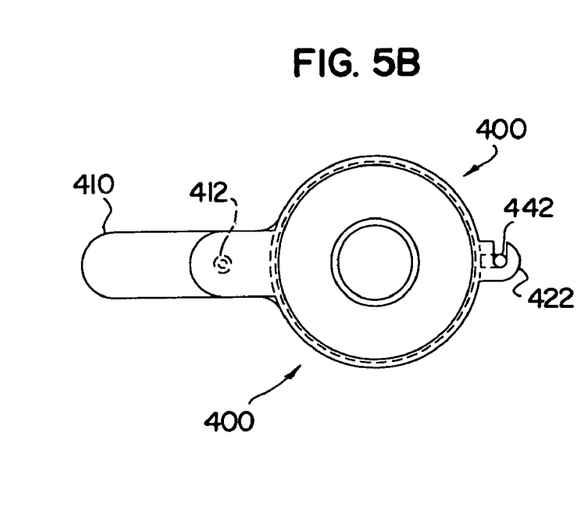

FIGS. 5a and 5b, illustrate dispenser 400, which includes handle 410, scoop 420 and cover 440. Cover 440 is fixably mounted to handle 410 at approximately the mid-length of the handle using a rivet or snap-fit type connection 412, for example. The cover 440 rotates about a fulcrum between the open and closed positions. When in the closed position, mating alignment of the cover 440 with the scoop 420 is ensured by pin 442 and hook 422. It should be noted that in this embodiment the cover can also act as a leveling device for the media.

Figure 6A:
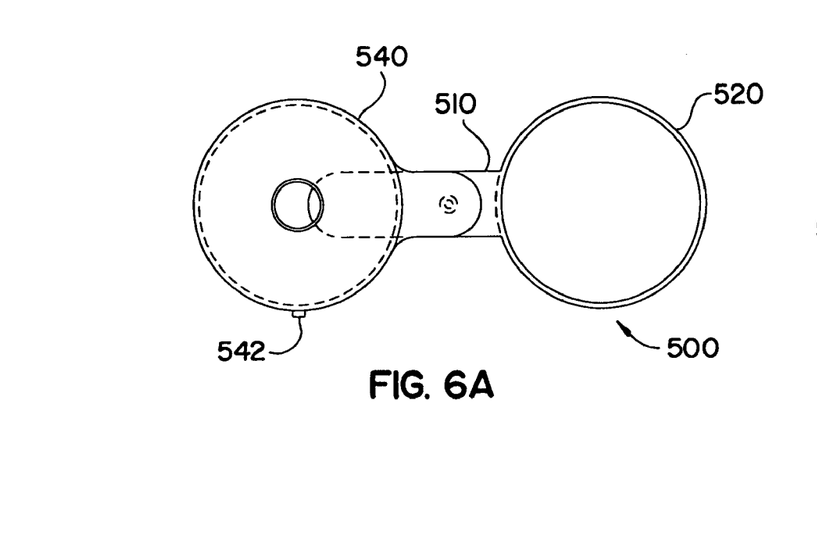
FIGS. 6a and 6b illustrate another embodiment of the dispensing device in accordance with the present invention wherein the cover is mounted to the handle and pivots about a fulcrum positioned approximately at the mid-length of the handle.
Figure 6B:
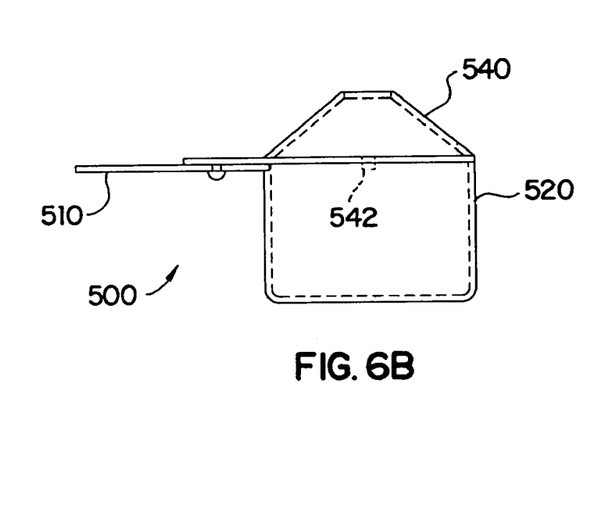
Figures 7A, 7B:
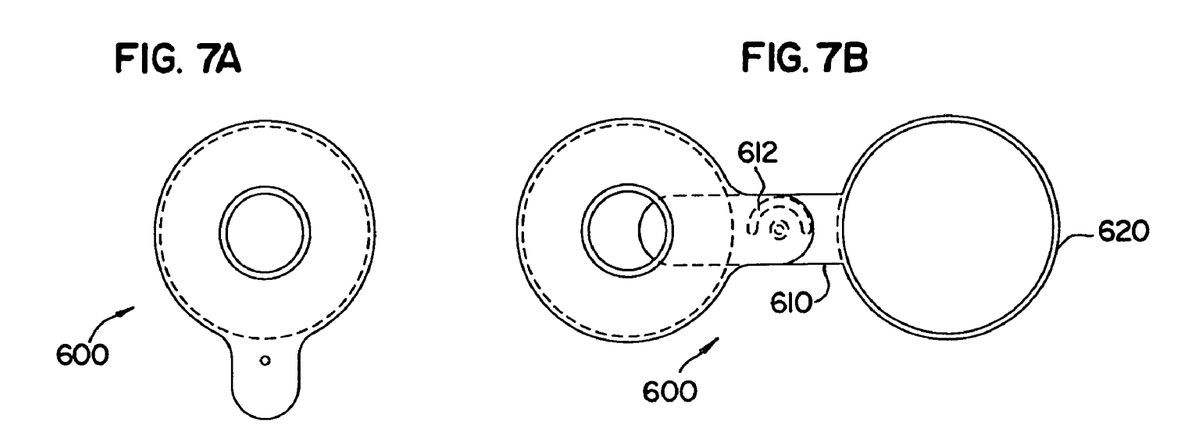
FIGS. 7a-7d illustrate another embodiment of the dispensing device in accordance with the present invention wherein the cover is mounted to the handle and pivots about a fulcrum positioned approximately at the mid-length of the handle.
Figure 7C:
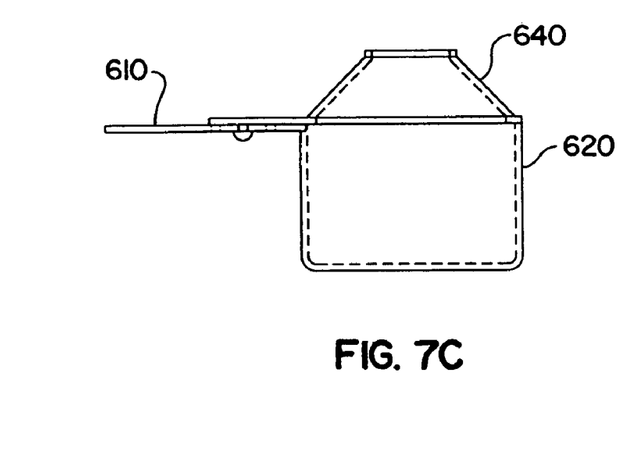
Figure 7D:
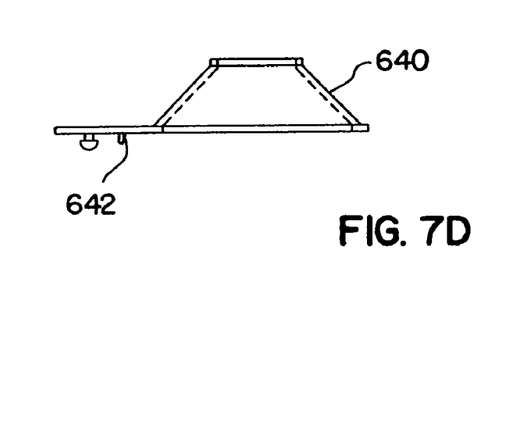

FIGS. 6a and 6b, illustrate dispenser 500 which is similar to dispenser 400 in that cover 540 is fixably mounted to handle 510 at approximately the mid-length of the handle and the cover 540 rotates about a fulcrum between the open and closed positions. However, mating alignment of the cover 540 with the scoop 520 is ensured by tab 542 formed on the cover 540.

FIGS. 7a through 7d, illustrate a dispenser 600 which is similar to dispenser 400 except that mating alignment of the cover 640 with the scoop 620 is ensured by pin 642 formed on the underside of the cover 640 and arcuate slot 612 formed in handle 610.

Figure 8A:
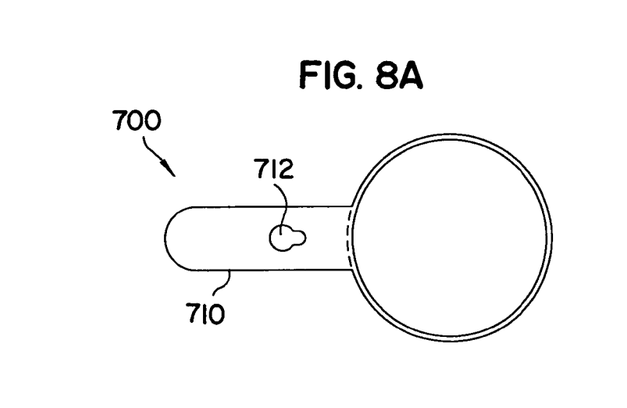
FIGS. 8a and 8b illustrate another embodiment of the dispensing device in accordance with the present invention wherein the cover is removably mounted to the handle using a slotted hole formed longitudinally in the handle.
Figure 8B:
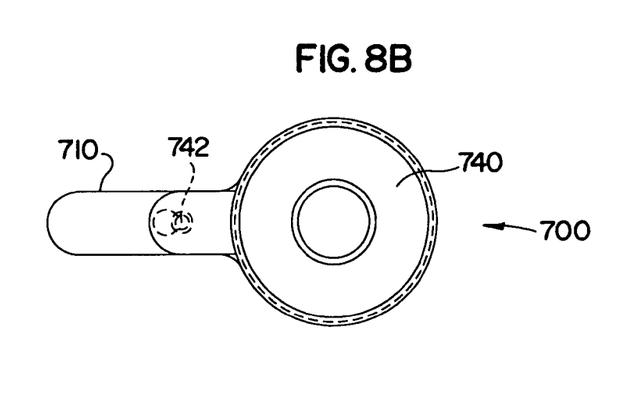

FIGS. 8a and 8b, illustrate a dispenser 700 which is similar to dispenser 400 except that the cover 740 is removably secured to the handle 710 by inserting pin 742, which depends from the bottom of the cover, into slotted hole 712.

Figures 9A, 9B:
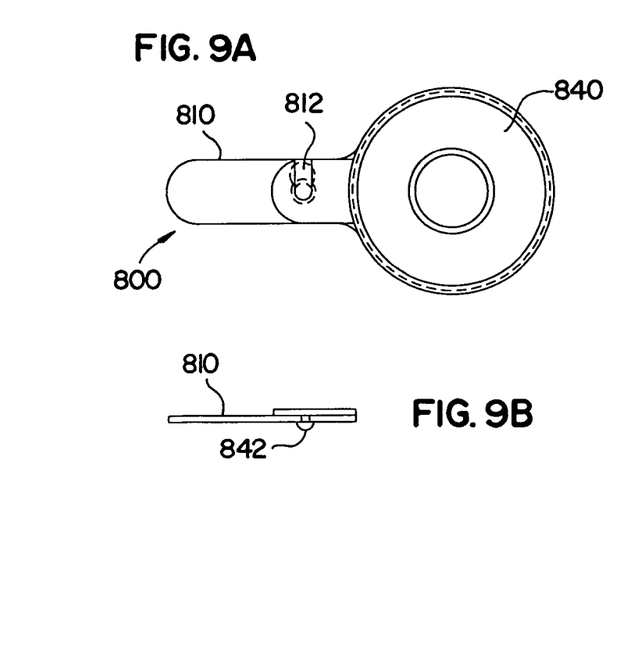
FIGS. 9a-9c illustrate another embodiment of the dispensing device in accordance with the present invention wherein the cover is removably mounted to the handle using a slotted hole formed in the handle perpendicular to its axis.
Figure 9C:
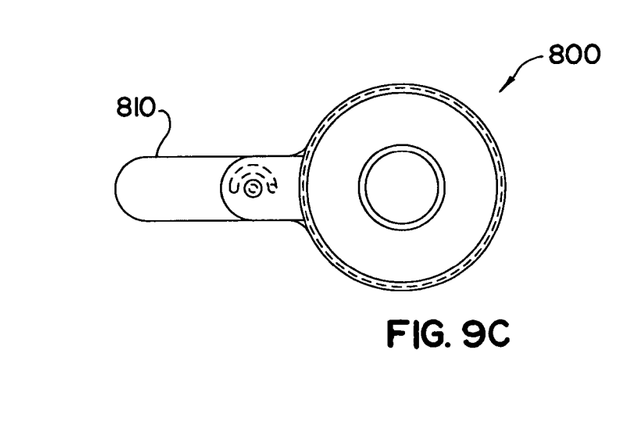

FIGS. 9a through 9c, illustrate a dispenser 800 having a cover 840 removably secured to the handle 810 by inserting pin 842, which depends from the bottom of the cover, into slotted hole 812 formed in handle 810.

Figure 10A:
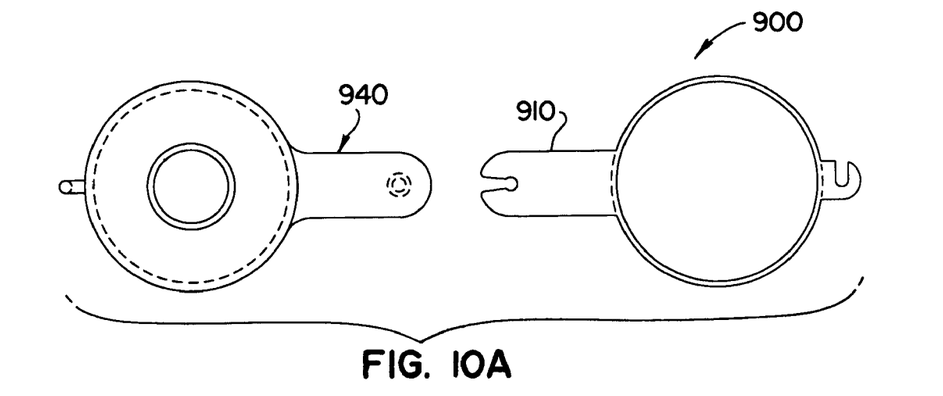
FIGS. 10a-10c illustrate another embodiment of the present invention wherein the cover is removably connected to the end of handle.
Figure 10B:
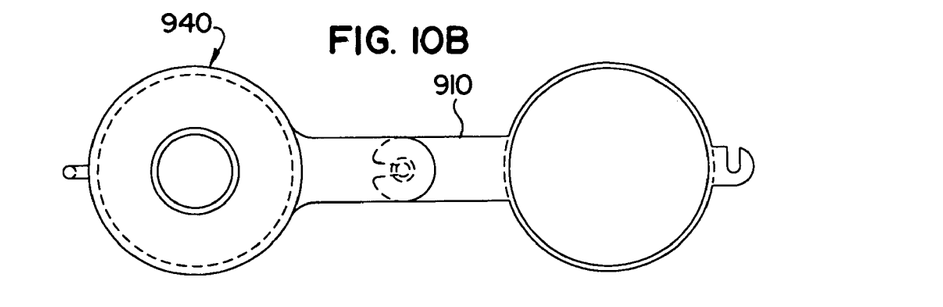
Figure 10C:
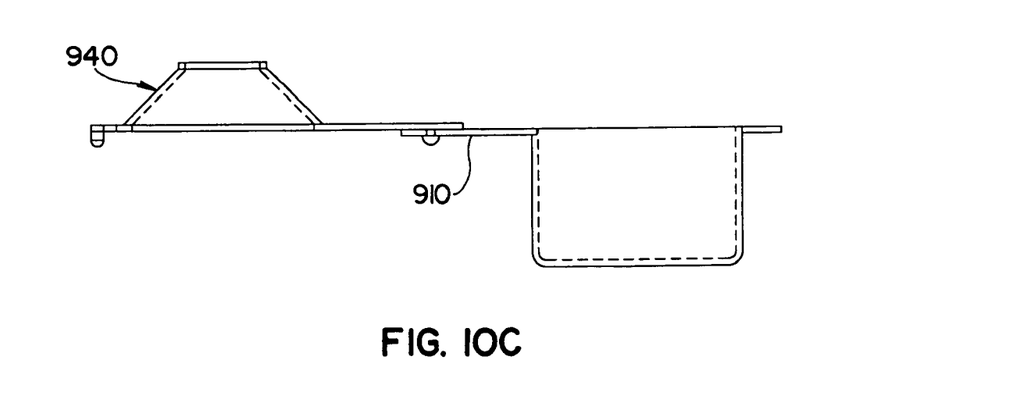

FIGS. 10b through 10c, disclose yet another dispenser 900 which is similar in structure and function to the previously described embodiments except that the cover 940 is removably attached to end of the handle 910 by inserting a pin associated with cover into a slotted hole formed in the handle.

Figure 11A:
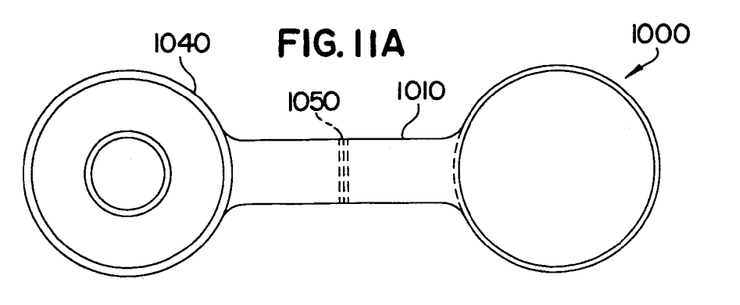
FIGS. 11a and 11b illustrate another embodiment of the present invention wherein the cover is connected to the end of handle by a plastic hinge.
Figure 11B:
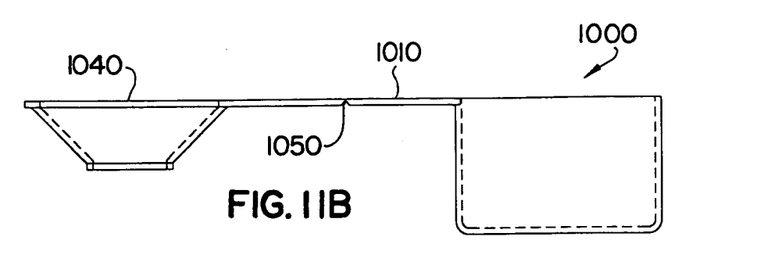

FIGS. 11a and 11b, disclose a dispenser 1000 wherein that the cover 1040 is attached to end of the handle 1010 by a plastic hinge 1050. Those skilled in the art will readily appreciate that other types of hinges can be employed, such as conventional hinge assemblies.

Figure 12A:
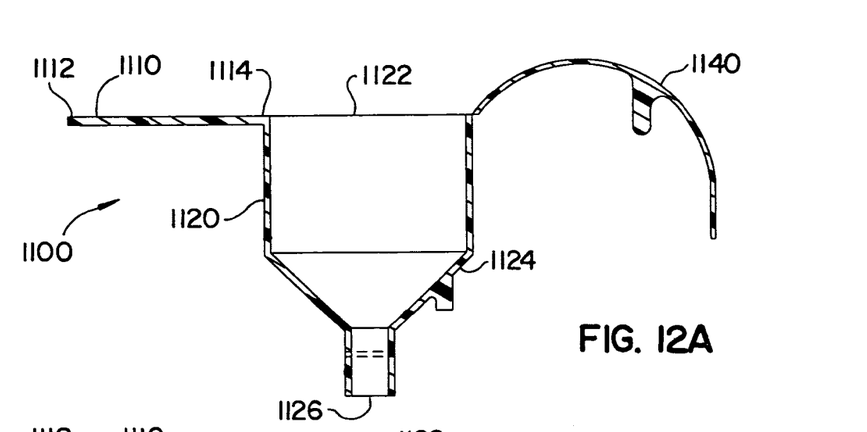
FIGS. 12a and 12b illustrate yet another embodiment of the present invention wherein the scoop has a dispensing orifice formed in the neck portion which is closed by a finger actuated lever mounted to the mouth of the scoop.
Figure 12B:
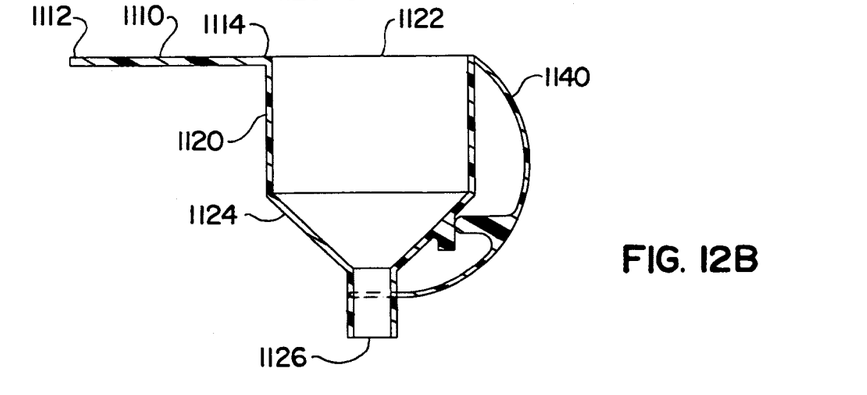

FIGS. 12a and 12b disclose a dispenser 1100 which includes, among other elements, an elongated handle 1110, a scoop 1120 and a stopper arm 1140. The elongated handle 1110 has proximal and distal ends 1112 and 1114 respectively. The scoop 1120 depends from the distal end 1114 of the handle and has an upper mouth 1122 and a funnel-shaped lower base 1124 that defines a spout 1126. In the embodiment disclosed in FIGS. 12a-12, the stopper arm 1140 is attached to the scoop 1120 and moves between a closed position, wherein a portion of the arm prevents media from pouring out of the spout 1126 of the scoop 1120 and a open position wherein media is allowed to pour out of spout 1126.

Figure 13:
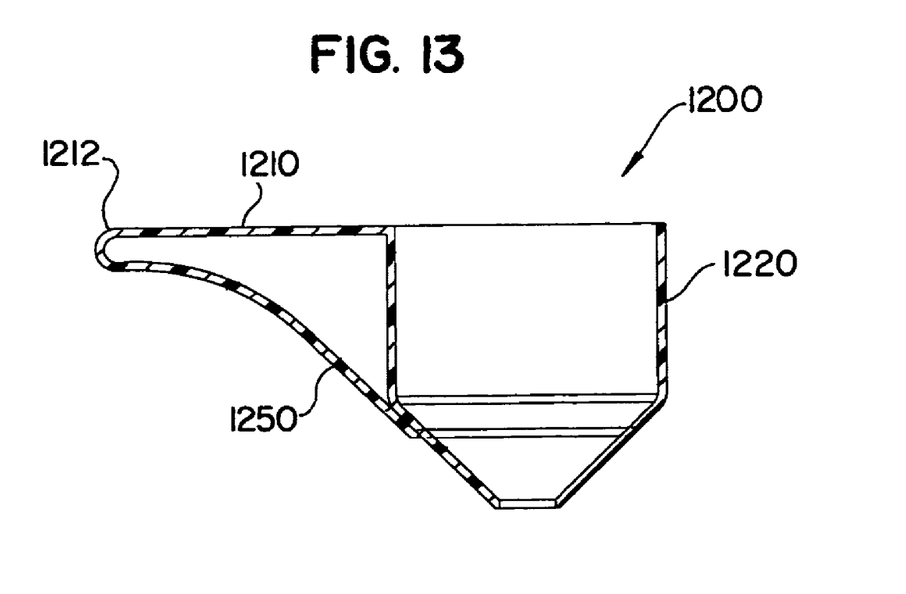
FIG. 13 is a side elavational view of yet another embodiment of the present invention which includes a finger-actuated lever mounted to the handle for closing the dispensing orifice.

FIG. 13 discloses a dispenser 1200 which is similar in structure to scoop 1100, except that the stopper arm 1250 is attached to the proximal end 1212 of handle 1210.

As clearly illustrated FIGS. 12a, 12b and 13, dispensers 1100 and 1200 are formed as a single-piece molded construction, but those skilled in the art would readily appreciate the dispensers can be formed from several pieces.

While the invention has been described with respect to preferred embodiments, those skilled in the art will readily appreciate that various changes and/or modifications can be made to the invention without departing from the spirit or scope of the invention as defined by the appended claims.

What is claimed is:

1. A device for dispensing media comprising:
   a) an elongated handle portion defining opposed proximal and distal ends and having a longitudinal axis;
   b) a cylindrical scoop portion depending integrally from the handle portion and having an open mouth at one end thereof and a closed bottom at an other end thereof to hold a measured amount of material for dispensment;
   c) a funnel-shaped cover portion having a lower base section including a bottom end with a circumferential rim and an upper dispensing end defining a discharge orifice;
   d) a flexible hinge extending between and formed monolithic with the mouth of the scoop portion and the rim of the lower base section of the cover portion, and defining a hinge axis that extends tangent to the mouth of the scoop portion, wherein the cover portion is adapted for movement about the hinge axis between an open position and a closed position; and
   e) securing means depending from the rim of the base section of the cover portion for engaging the mouth of the scoop portion to secure the cover portion in the closed position, wherein the mouth of the scoop portion and the rim of the base section of the cover portion are in mating contact when the cover portion is in the closed position so as to enable the securing means depending from the rim of the base section to engage the mouth of the scoop portion.

* * * * *

UNITED STATES PATENT AND TRADEMARK OFFICE
CERTIFICATE OF CORRECTION

PATENT NO.            : 7,441,676 C1                                Page 1 of 1
APPLICATION NO.       : 90/013422
DATED                 : January 7, 2016
INVENTOR(S)           : Drew Pickering, Jr.

It is certified that error appears in the above-identified patent and that said Letters Patent is hereby corrected as shown below:

Claims

Col. 1, line 17, Dependent claim 2:

remove: The device of claim 1, wherein the bottom end of cover portion defines a diameter that is larger than a diameter defined by the open mouth of the scoop portion such that, in the closed position, a portion of the scoop extends within the cover portion.

insert: --The device of claim 1, wherein the bottom end of the cover portion defines a diameter that is larger than a diameter defined by the open mouth of the scoop portion such that, in the closed position, a portion of the scoop portion extends within the cover portion.--

Col. 2, line 25, Dependent claim 14:

remove: The device of claim 1, wherein a lard is formed at the mouth of the scoop, and wherein the securing means contacts an upper portion of the land as the cover portion is moved to the closed position.

insert: --The device of claim 1, wherein a land is formed at the mouth of the scoop, and wherein the securing means contacts an upper portion of the land as the cover portion is moved to the closed position.--

Signed and Sealed this
Third Day of May, 2016

Michelle K. Lee
*Director of the United States Patent and Trademark Office*

(12) EX PARTE REEXAMINATION CERTIFICATE (10786th)
United States Patent
Pickering, Jr.

(10) Number: US 7,441,676 C1
(45) Certificate Issued: Jan. 7, 2016

(54) DEVICE FOR DISPENSING MEDIA (75) Inventor: Drew Pickering, Jr., Shelton, CT (US)

(73) Assignee: Kenzinc LLC

Reexamination Request:
No. 90/013,422, Jan. 5, 2015

Reexamination Certificate for:
Patent No.: 7,441,676
Issued: Oct. 28, 2008
Appl. No.: 11/046,457
Filed: Jan. 28, 2005

Related U.S. Application Data (60) Provisional application No. 60/539,697, filed on Jan. 28, 2004.

(51) Int. Cl.
B65D 88/26 (2006.01)
G01F 19/00 (2006.01)
(52) U.S. Cl.
CPC .................... G01F 19/002 (2013.01)
(58) Field of Classification Search
None
See application file for complete search history.

(56) References Cited

To view the complete listing of prior art documents cited during the proceeding for Reexamination Control Number 90/013,422, please refer to the USPTO's public Patent Application Information Retrieval (PAIR) system under the Display References tab.

Primary Examiner — Robert M Fetsuga (57) ABSTRACT

Disclosed are devices for dispensing media which include, inter alia, a dispenser body, a funnel-shaped cover and a mechanism for securing the cover in the closed position to facilitate the dispensing of media from the spout. The body of the dispenser has an elongated handle with proximal and distal ends and a scoop depending from the distal end of the handle. The funnel-shaped cover is attached to the body of the dispenser and includes an upper spout and a lower base. The cover is adapted for movement between an open position and a closed position; wherein in the open position the cover is spaced apart from the scoop and allows media to be placed into the scoop, and in the closed position, the cover is placed over the scoop such that when media is dispensed from the scoop it passes through the spout of the cover. Also disclosed is a device for dispensing media which includes, among other elements, an elongated handle, a scoop and a stopper arm. The stopper arm is attached to the scoop and moves between a closed position wherein a portion of the arm prevents media from pouring out of the spout of the scoop and a open position wherein media is allowed to pour out of the spout.

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 1 is confirmed.

New claims 2-15 are added and determined to be patentable.

2. *The device of claim 1, wherein the bottom end of cover portion defines a diameter that is larger than a diameter defined by the open mouth of the scoop portion such that, in the closed position, a portion of the scoop extends within the cover portion.*

3. *The device of claim 2, wherein the larger diameter of the bottom end of the cover portion functions to align and center the cover portion with the open mouth of the scoop portion when the cover portion is moved into the closed position.*

4. *The device of claim 1, wherein the hinge axis intersects the longitudinal axis defined by the handle portion at an acute angle.*

5. *The device of claim 1, wherein the handle portion, the scoop portion, the cover portion and the securing means are a single-piece molded construction.*

6. *The device of claim 1, wherein the securing means includes at least one securing arm associated with the cover portion.*

7. *The device of claim 6, wherein the at least one securing arm cooperates with at least one beveled land formed on the scoop.*

8. *The device of claim 1, wherein the cover portion defines an inner surface, and wherein the inner surface of the cover portion is configured with a smooth radius to allow media to freely dispense through the discharge orifice.*

9. *The device of claim 1, wherein the open mouth of the scoop portion is beveled.*

10. *The device of claim 1, wherein the flexible hinge includes a first hinge arm and a second hinge arm.*

11. *The device of claim 10, wherein the first hinge arm is attached to the cover portion and the second hinge arm is attached to the scoop portion.*

12. *The device of claim 11, wherein a space is provided between the first hinge arm and the second hinge arm when the cover portion is in the closed position.*

13. *The device of claim 1, wherein the securing means flexes as the cover portion is moved to the closed position.*

14. *The device of claim 1, wherein a lard is formed at the mouth of the scoop, and wherein the securing means contacts an upper portion of the land as the cover portion is moved to the closed position.*

15. *The device of claim 14, wherein the securing means frictionally engages the land to restrain the cover portion in the closed position.*

\* \* \* \* \*